United States Patent [19]

Nix, Jr.

[11] Patent Number: 4,812,718
[45] Date of Patent: Mar. 14, 1989

[54] RESOLUTION DELTA GUN COLOR MONITOR SYSTEM APPARATUS

[75] Inventor: Lawrence A. Nix, Jr., Ellicott City, Md.

[73] Assignee: The United States of America as represented by the Secretary of the Air Force, Washington, D.C.

[21] Appl. No.: 132,497

[22] Filed: Dec. 14, 1987

[51] Int. Cl.$^4$ ............................................. H01T 29/58
[52] U.S. Cl. .................................................. 315/382
[58] Field of Search ...................... 315/382, 371, 368; 358/168, 169

[56] References Cited

U.S. PATENT DOCUMENTS

| | | | |
|---|---|---|---|
| 3,887,837 | 6/1975 | Nakayama et al. | 315/368 |
| 4,277,722 | 7/1981 | Hawken et al. | 315/382 |
| 4,338,548 | 7/1982 | Bono et al. | 315/382 |
| 4,499,457 | 2/1985 | Hintze | 315/382 |
| 4,546,291 | 10/1985 | Morioka et al. | 315/382 |
| 4,598,234 | 7/1986 | McKibben | 315/382 |
| 4,633,143 | 12/1986 | McCartney, Jr. | 315/368 |
| 4,633,144 | 12/1986 | McKibben | 315/382 |
| 4,704,565 | 11/1987 | Blacker, Jr. et al. | 315/382 |

Primary Examiner—Theodore M. Blum
Assistant Examiner—David Cain
Attorney, Agent, or Firm—William Stepanishen; Donald J. Singer

[57] ABSTRACT

High resolution color monitor apparatus having separate focusing supplies for each of the three focusing grids.

6 Claims, 3 Drawing Sheets

RESOLUTION DELTA GUN COLOR MONITOR SYSTEM APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a color monitor apparatus, and in particular to an improved resolution delta gun color monitor apparatus.

The man-machine interface in air traffic control systems is still primarily the cathode ray tube (CRT) despite prophacies of its demise for at least the last 20 to 25 years. Of course as time has passed, the demands of ever increasing data loads has required the development of high resolution CRT's to meet the system requirements.

In an effort to ease some of the burden on the air traffic controller, color displays are beginning to be employed in some of the latest air traffic control systems. In these systems, color is employed to differentiate various types of data but does not reduce the amount of information which is actually required to be displayed at a given time by the display.

At the present time, the color displays that are currently in use, are in some military systems. The largest displays that are used in these present systems, employ a 19 inch color shadow mask CRT.

During the last year or so, an air traffic control system has been under development which is to utilize a 25 inch delta gun shadow mask CRT. At the present time, there are only two suppliers of high resolution 25 inch color CRT's of this type being made in the free world (Mitsubishi and Matsushita). When this development was started, insufficient data was available to indicate Which of these CRT's was better for this system.

In the last few months, competing monitor vendors have supplied monitors for evaluation. One vendor supplied several prototypes that was specified for this system. While one of the CRT vendor's tubes were found to have somewhat better resolution performance than the other, both fell short at the edges of the raster and particularly in the corners.

One of the available CRT's was investigated by one of the competing display vendors in conjunction with the CRT manufacturer after evaluation of their monitor indicated their monitors fell short of the desired resolution performance, particularly near the edges and corners of the display. Perhaps the greatest single problem identified in their reports was the spread in the best center focus voltage for each of the three electron guns employed for colors of the delta gun, shadow mask color CRT. The cause of this focus spread was identified as being caused by the unavoidable manufacturing tolerances in the spacings and alignment of the parts and components that make up each of the three separate guns.

Extensive tests have been performed on the resolution performance of the CRT in the first engineering prototype monitor from a monitor vendor employing the second of the two available CRT manufacturers tubes. This tube also exhibited similar problems with the spread of the focus voltage that was required for maximum resolution of each of the three electron guns.

The accepted production tolerance limits for the magnitude of the difference in the best focus potentials for both of the available high resolution CRT manufacturers tubes exceeded the dynamic focus potential that was recommended by each of the CRT manufacturers as indicated on their respective CRT data sheets.

Careful evaluation of the test data obtained from each of the two available CRT manufacturer tubes showed the performance of any one of the electron guns employed alone in a tube exhibited considerably better edge and corner resolution performance than that typically achieved by the tube as a whole since all three electron guns are tied to common focus potential.

It has been common industry practice to tie all three electron guns to a common focus potential so as to simplify both the CRT construction as well as the associated monitor circuitry. This has been permissible in the past because the delta gun color CRT's were originally developed for and used in the entertainment industry for home television sets. It has only been recently that color CRT's are being employed in applications demanding much higher resolution such as the Cad-Com industry and now the air traffic control applications.

The state of the art of color monitor apparatus is well represented and alleviated to some degree by the prior art apparatus and approaches Which are contained in the following U.S. patents:

U.S. Pat. No. 3,887,837 issued to Nakayama et al on June 3, 1975;

U.S. Pat. No. 4,546,291 issued to Morioka et al on Oct. 8, 1985; and

U.S. Pat. No. 4,633,143 issued to McCartney on Dec. 30, 1986.

Nakayama et al discloses a means for focusing a color CRT by placing a first high voltage (HV) on the layer of the conical portion of the CRT. A second high voltage (HV) for operation of the electron gun is supplied via a lead wire extending within the conical portion of the CRT through a conductive tubular member. The conductive tubular member is electrically connected with the conductive layer by an arcuate spring member which further serves to accurately and securely position the tubular member and the lead wire therein within the tube envelope, thereby ensuring proper engagement with the gun of a contact member that extends from the lead wire.

Marioka et al describes a TV color camera tube having individual means for supplying current to the red, green, and blue focusing coils. A main focus current control circuit is connected in series with the series-connected focusing coils for controlling a main focus current so as to maintain an adjustably predetermined value thereof, and individual focus current control circuits respectively corresponding to the image pick-up tubes are connected in parallel with the respective focusing coils for controlling the individual focus current flowing through each of the focusing coils without influencing the individual focus currents through the other coils.

McCartney discloses a delta gun CRT wherein the focus position for each of the electron gun is pre-calculated to position the beam in the four quadrants of the CRT face. The quadrants of each of the gun's coordinate system is the same as the quadrants of the CRT screen thereby allowing each of the coefficients to be changed or adjusted only when the terms it multiplies is zero. Complete convergence correction for the entire screen may be accomplished using only nine screen locations.

Because of manufacturing tolerances it has hitherto been difficult to bring the three color electron guns into a high degree of resolution. The prior art taught that the focus supply voltage source was designed to control the focus bias potential on all three color electron guns. However, the prior art devices did not provide a means for individually controlling the focus bias potential of the three guns.

SUMMARY OF THE INVENTION

The present invention utilizes an improved resolution delta gun color cathode ray tube (CRT) that has a delta gun focusing system which employs only one modulated high voltage focus supply and dynamic focus circuit. The high voltage focus supply and the dynamic circuit are utilized in conjunction with three lower voltage DC supplies which are derived from three adjustable voltage divider circuits that are supplied by a common DC power supply. In this manner one of the electron guns is focused at an optimum resolution through use of the common focus supply and its potentiometer. The other two electron guns of the CRT are then brought to maximum resolution by adjustment of the individual potentiometers in their bias focus circuits.

It is one object of the present invention, therefore, to provide an improved resolution delta gun color monitor apparatus.

It is another object of the invention to provide an improved resolution delta gun color monitor apparatus that utilizes three separate focusing electrodes.

It is yet another object of the invention to provide an improved resolution delta gun color monitor apparatus that utilizes three separate focus power supplies and three separate dynamic focus signals.

It is still another object of the invention to provide an improved resolution delta gun color monitor apparatus that employs only one modulated high voltage focus supply and dynamic focus circuit in conjunction with three lower voltage DC supplies.

It is an even further object of the invention to provide an improved resolution delta gun color monitor apparatus wherein three potentiometers on a common DC power supply are utilized It is yet another object of the invention to provide an improved resolution delta gun color monitor apparatus wherein the main focus lens employed in the electron guns be divided into two lenses.

It is still a further object of the invention to provide an improved resolution delta gun color monitor apparatus wherein the grid structure $G_3$ be broken into two grid structures, $G_3$ and $G_4$.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 1:
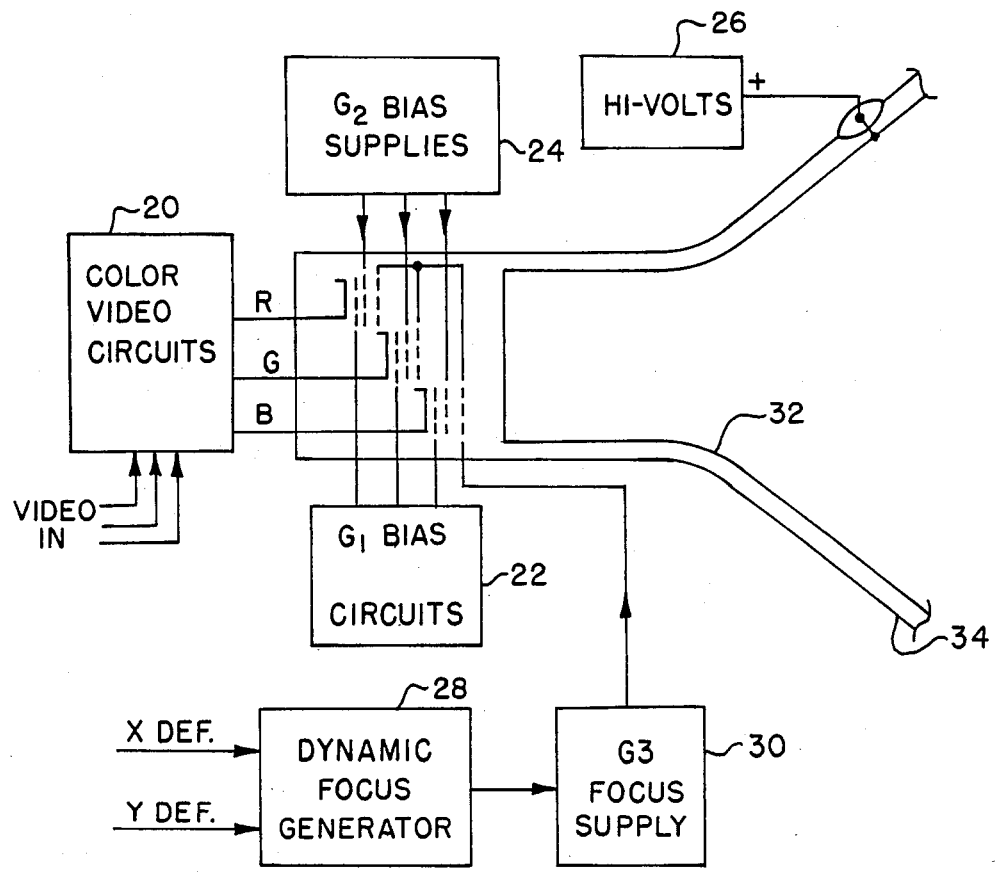
FIG. 1 is a partial schematic diagram of a typical prior art focusing circuit for a high resolution color monitor.

Referring now to FIG. 1 there is shown a partial schematic of a prior art high resolution color monitor. The color monitor apparatus has a delta gun arrangement in which a separate electron gun is utilized for the red, green and blue color signals. The three electron guns are identical to each other. Therefore, the description of any one of the electron guns is the same description for the other two guns. The red electron gun comprises a cathode, a first grid $G_1$, a second grid $G_2$ and a third grid $G_3$. As is well known in the art, this gun configuration is essentially conventional. There is associated with these electron guns an anode 32 which is formed on the inner surface of the cathode ray tube 34. The third grid of each electron gun is considered to be an electron lens which focuses the electron beam for its respective electron gun on the face of the cathode ray tube. An anode connection is shown on the outer surface of the cathode ray tube 30. Color video signals as shown are applied to the color video circuit unit 20. The individual color signals, red, green and blue are applied to the cathodes of their respective electron guns. The first grid $G_1$ is supplied a grid bias signal from the $G_1$ bias circuit unit 22. This bias circuit unit 22 supplies the grid bias for each of the first grids $G_1$ of the respective electron guns red, green and blue. The second grid $G_2$ of the electron guns red, green and blue receive a voltage signal respectively from the $G_2$ bias supply unit 24. The $G_2$ bias supply unit 24 typically supplies a voltage bias signal of 300-700 volts. The anode 32 which is shown positioned within the cathode ray tube 30 is connected as shown to a high voltage power supply unit 28. The high voltage power supply unit 2 typically provides a high voltage signal of 25-30 kilovolts. The X deflection and the Y deflection signals are applied to the dynamic focus generator unit 26. Dynamic focus generator unit 26 typically provides an output signal which may be represented by the function $\sqrt{X^2+Y^2}$. The output signal from the dynamic focus generator unit 26 is applied to the focus supply unit 30. The focus supply unit 30 provides a parabolic modulation signal which is superimposed on DC signal to the focusing grids $G_3$ of the electron guns red, green and blue.

FIG. 1 shows a diagram of the current practice for a high resolution monitor in the area of the tube and focusing circuits. As is indicated, current practice employs one focus power supply and a dynamic focus signal which is employed to partially compensate for deflection defocusing effects and the difference in the deflection radius of the CRT faceplate radius of curvature. In this arrangement, each of the three separate electron gun focus lenses is tied to a common focusing system as indicated in FIG. 1.

Figure 2:
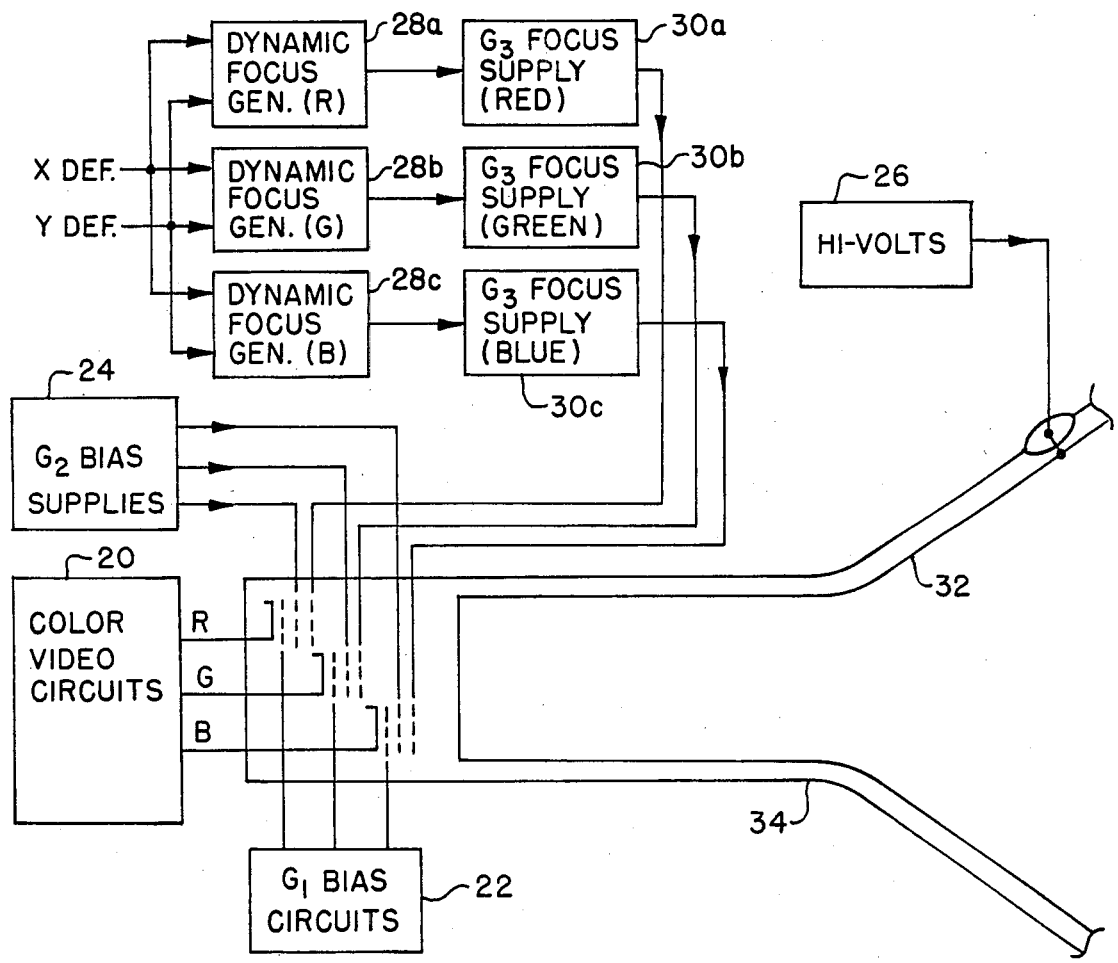
FIG. 2 is a partial schematic diagram of the improved resolution delta gun color monitor apparatus according to the present invention.

Referring now to FIG. 2 there is shown a partial schematic diagram of the improved high resolution delta gun color monitoring apparatus. The high resolution delta gun color monitoring apparatus comprises the same elements as the prior art high resolution monitor with the exception that a single dynamic focus generator unit 28 and the focus supply unit 30 of FIG. 1 now represent three units each. These units are shown in FIG. 2 as dynamic focus generator unit 28a, 28b and 28c. The focus supply units are represented by units 30a, 30b and 30c. In FIG. 1 the third grid $G_3$ of the three electron guns is connected in common within the cathode ray tube 30 and receive a bias signal from a single focus supply unit 30. In FIG. 2 the third grid $G_3$ of the three electron guns red, green and blue separately emerge from the cathode ray tube 34 and receive separate focus supply signals from their respective focus supply units 30a, 30b and 30c. The X deflection and the Y deflection signals are respectively applied to the dynamic focus generator units 28a, 28b and 28c. The output signals from the dynamic focus generator units 28a, 28b and 28c are respectively applied to their focus supply unit 30a, 30b and 30c. The color video circuit unit 20, the first grid bias circuit unit 22, the second grid $G_2$ bias supply unit 24 and the high voltage supply unit 26 are essentially the same units as shown and described in FIG. 1. The dynamic focus generator units 28a, 28b and 28c perform the same signal function of $\sqrt{X^2+Y^2}$ on the input X deflection and Y deflection signals as before.

The electron gun biasing configuration provides an effective solution to the resolution problem which resulted from the spread in the best center focus potential. In the present invention, the three electron guns which are used in the delta gun color tube have each of the three focus electrodes brought out separately rather than the single common electrode as is the present practice (shown in FIG. 1). This configuration permits each electron gun to be adjusted to its best operating point individually and thus provide the maximum performance that could be achieved with each of the gun independently. However, as shown in FIG. 2, this requires the use of three separate focus supplies and three separate dynamic focus signals.

Figure 3:
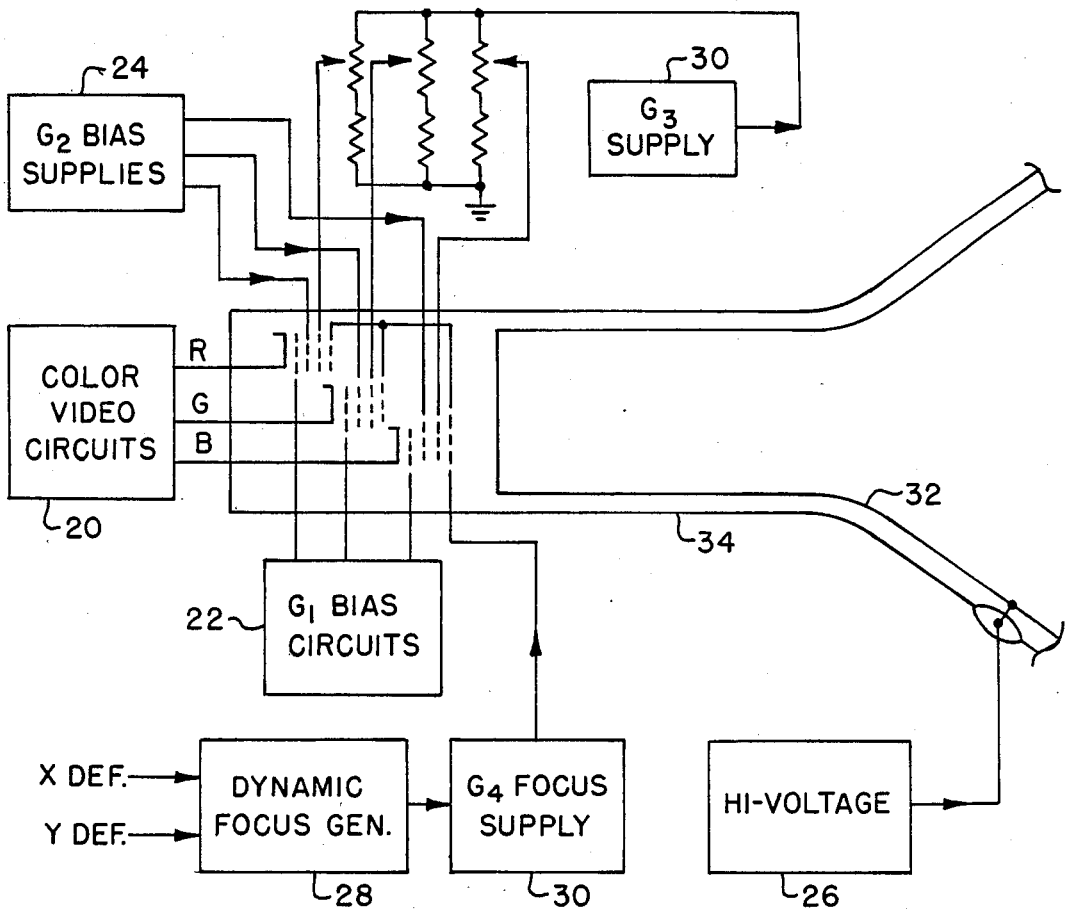
FIG. 3 is a partial schematic diagram of a focusing correction circuit for a delta gun color monitor apparatus.

In light of the requirement for three focus supplies and three dynamic focus circuits associated with this solution, there is an alternative embodiment. In FIG. 3 there is shown a high resolution delta gun color monitor apparatus having the same basic components as shown and described in FIGS. 1 and 2 with these notable exceptions. In FIG. 3 a single dynamic focusing generator unit and focus supply unit are utilized. An additional grid $G_4$ has been added to each of the electron guns red, green and blue. The fourth grid $G_4$ is arranged with a common connection within the neck of the cathode ray tube and it receives its signal from the $G_4$ focus supply unit. This is a similar operation and circuit configuration as shown in the prior art apparatus in FIG. 1. The third grid $G_3$ which is positioned between the second grid $G_2$ and the fourth grid $G_4$ for each of the electron guns red, green and blue are individually extracted from the neck of the cathode ray tube 34. The individual voltage divider networks 40 are connected respectively to the third grids $G_3$ of the electron guns red, green and blue. A single supply unit 42 provides the voltage signal to the voltage divider unit 40. The voltage divider unit 40 comprises three parallel branches connected between the $G_3$ supply unit 42 in ground. Each of the voltage divider branches of the voltage divider network 40 comprises a potentiometer in series with a fixed resistor. The variable arm of the potentiometer is respectively connected to the third grid $G_3$ of the electron guns red, green and blue.

The alternate embodiment employs only one modulated high voltage focus supply and dynamic focus circuit in conjunction with three lower voltage DC supply sources which could be derived from three potentiometers on a common DC power supply as indicated in FIG. 3. This embodiment requires that the main focus lens employed in the electron guns be broken into two lenses, that is that the $G_3$ structure be broken in to a $G_3$ and $G_4$ structure with the interface between $G_4$ and the anode being the same as was previously with $G_3$ and the anode. The interface between $G_3$ and $G_4$ would only be required to provide sufficient lens power to adjust all three electron guns to the same ($G_4$=to the old $G_3$) potential. Although this would require adding an additional three pins to the base of the CRT structure, this approach would appear to overcome the focus potential spread problem and its associated system performance degradation by the addition of only one DC power supply with three separate taps to the display.

Some gun designs currently exist which employ a compound gun design having a $G_3$ and $G_4$ structure. This arrangement is not currently arranged so as to solve the problem described here, however.

One possible adjustment procedure for achieving maximum performance for the proposed system might be to first adjust all three $G_3$ elctrodes to the common maximum $G_3$ supply and focus first one of the guns for best CRT center focus by adjusting $G_4$ and noting its potential. In like fashion focus and record the $G_4$ potential for best center focus for each of the two remaining electron guns. The $G_4$ supply would then be set to the lowest voltage as determined by these measurements. The $G_3$ potential for this gun would not be readjusted. The $G_3$ potentials for the other two guns would then be adjusted to provide optimum focus for the common $G_4$ potential by lowering the $G_3$ potential from its maximum value. This procedure would thus permit trimming the lens power of two of the three guns to compensate for the unavoidable manufacturing tolerances of the three individual electron guns while still employing only one primary focus power supply and dynamic focus circuit at the cost of one additional DC supply whose value would be intermediate between $G_2$ and $G_4$ with three separate taps as indicated in FIG. 3 along with the indicated electron gun modifications.

Although the invention has been described with reference to a particular embodiment, it will be understood to those skilled in the art that the invention is capable of a variety of alternative embodiments within the spirit and scope of the appended claims.

What is claimed is:

1. A high resolution delta gun color monitor apparatus comprising in combination:
   a delta gun cathode ray tue having a first, second and third electron gun and an anode, each electron gun of said first, second and third electron guns comprising:
   a cathode to receive a color video signal,
   a first grid, $G_1$ aligned with said cathode to receive a first bias signal,
   a second grid, $G_2$ aligned with said first grid $G_1$ to receive a second bias signal, and
   a third grid $G_3$ aligned with said second grid $G_2$,
   a deflection control unit to receive X and Y deflection signals, said deflection control unit providing focus signals, said deflection control unit comprising a first, second and third dynamic focus generator/focus supply unit, said first dynamic focus generator/focus supply unit operatively connected to said first electron gun, said second dynamic focus generator/focus supply unit operatively connected to said second electron gun, and said third dynamic focus generator/focus supply unit operatively connected to said third electron gun.

2. A high resolution delta gun color monitor apparatus comprising in combination:
   a delta gun cathode ray tube having a first, second and third electron gun and an anode, each electron gun of said first, second and third electron guns comprising:
      a cathode to receive a color video signal,
      a first grid, $G_1$ aligned with said cathode to receive a first bias signal,
      a second grid, $G_2$ aligned with said first grid $G_1$ to receive a second bias signal,
      a third grid $G_3$ aligned with said second grid $G_2$,
      a fourth grid $G_4$ aligned with said third grid $G_3$, and
   a deflection control unit to receive X and Y deflection signals, said deflection control unit providing focus signals to the fourth grid $G_4$ of said first, second and third electron guns, said fourth grid $G_4$ of said first, second and third electron guns having a common connection at one end, each third grid $G_3$ receiving an independently variable voltage signal from a voltage divider network, said voltage divider network receiving a third bias signal.

3. A high resolution delta gun color monitor apparatus as described in claim 2 wherein said third bias signal is greater than said second bias signal but less than said fourth bias signal.

4. A high resolution delta gun color monitor apparatus as described in claim 2 wherein said deflection control unit comprises a dynamic focus generator which receives said X and Y deflection signal and a $G_4$ focus bias supply.

5. A high resolution delta gun color monitor apparatus as described in claim 2 wherein said voltage divider network comprises three parallel voltage divider circuits each comprising a variable resistor in series with a resistor.

6. A high resolution delta gun color monitor apparatus as described in claim 4 wherein said dynamic focus generator processes the X and Y deflection signals according to the expression $f(\sqrt{X^2+Y^2})$.

* * * * *